United States Patent
Mongeau

(10) Patent No.: US 12,486,829 B2
(45) Date of Patent: Dec. 2, 2025

(54) METHOD FOR HANDLING GEARBOX VIBRATIONS IN A WIND TURBINE

(71) Applicant: VESTAS WIND SYSTEMS A/S, Aarhus (DK)

(72) Inventor: Peter Mongeau, Center Conway, NH (US)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 18/862,939

(22) PCT Filed: May 2, 2023

(86) PCT No.: PCT/DK2023/050107
§ 371 (c)(1),
(2) Date: Nov. 4, 2024

(87) PCT Pub. No.: WO2023/213367
PCT Pub. Date: Nov. 9, 2023

(65) Prior Publication Data
US 2025/0314237 A1 Oct. 9, 2025

Related U.S. Application Data

(60) Provisional application No. 63/337,756, filed on May 3, 2022.

(30) Foreign Application Priority Data

Jun. 2, 2022 (DK) .............................. PA202270296

(51) Int. Cl.
*F03D 7/02* (2006.01)

(52) U.S. Cl.
CPC .......... *F03D 7/0296* (2013.01); *F03D 7/0272* (2013.01); *F05B 2260/4031* (2013.01); *F05B 2270/334* (2013.01)

(58) Field of Classification Search
CPC ................. F03D 7/0296; F03D 7/0272; F05B 2260/4031; F05B 2270/334
See application file for complete search history.

(56) References Cited

U.S. PATENT DOCUMENTS 8,044,529 B2 * 10/2011 Egedal ................. F03D 7/0276
290/55
8,169,098 B2 * 5/2012 Scholte-Wassink .... F03D 7/042
290/55

(Continued)

FOREIGN PATENT DOCUMENTS

| CN | 107850050 B | * 12/2020 | ........... F03D 7/0224 |
| EP | 1944667 A1 | 7/2008 | |

(Continued)

OTHER PUBLICATIONS

Danish Patent and Trademark Office, 1st Technical Examination including the Search Report and Search Opinion for Application PA 2022 70296 dated Dec. 6, 2022.

(Continued)

*Primary Examiner* — Pedro J Cuevas
(74) *Attorney, Agent, or Firm* — Patterson + Sheridan, LLP; Gero G. McClellan

(57) ABSTRACT

A method for controlling operation of a generator for a wind turbine is disclosed. A measure for a rotational speed of the generator, and a measure for vibrations originating from gear tooth meshing of a gearbox of the wind turbine, at the rotational speed of the generator, and at least one amplitude of a harmonic in the gearbox vibrations is determined. An initial phase angle and an initial amplitude are selected, based on the rotational speed, on initial characteristics of the wind turbine, and on the at least one amplitude of the harmonic. An optimization process is performed to obtain an adjusted phase angle and an adjusted amplitude. A torque modulating signal for the generator, specifying the adjusted (Continued)

phase angle and the adjusted amplitude, is generated and injected into the generator. Information regarding residual vibrations at the minimised resultant vibration is derived.

12 Claims, 9 Drawing Sheets

(56) References Cited

U.S. PATENT DOCUMENTS

| | | | |
|---|---|---|---|
| 11,136,962 B2* | 10/2021 | Pedersen | F03D 7/0224 |
| 11,559,308 B2* | 1/2023 | Yates | A61B 17/320092 |
| 12,264,647 B1* | 4/2025 | Langbak | F03D 17/033 |
| 12,345,235 B2* | 7/2025 | Mongeau | F03D 15/101 |
| 2005/0284225 A1 | 12/2005 | Luo | |
| 2006/0066111 A1 | 3/2006 | Suryanarayanan et al. | |
| 2009/0250932 A1* | 10/2009 | Egedal | F03D 7/0276 290/44 |
| 2009/0292397 A1* | 11/2009 | Bjerge | F03D 7/0272 290/44 |
| 2010/0013235 A1* | 1/2010 | Bjerge | F03D 7/0296 290/55 |
| 2010/0045038 A1* | 2/2010 | Skaare | F03D 7/0224 290/44 |
| 2011/0204636 A1* | 8/2011 | Scholte-Wassink | H02P 9/008 290/44 |
| 2019/0081583 A1 | 3/2019 | Xie | |
| 2019/0201047 A1* | 7/2019 | Yates | A61B 18/1445 |
| 2020/0263666 A1* | 8/2020 | Pedersen | F03D 7/0224 |
| 2023/0092371 A1* | 3/2023 | Yates | H04N 7/183 |
| 2024/0271599 A1* | 8/2024 | Flögel | F03D 7/0224 |
| 2025/0154931 A1* | 5/2025 | Mongeau | F03D 15/00 |
| 2025/0188903 A1* | 6/2025 | Mongeau | F03D 17/015 |

FOREIGN PATENT DOCUMENTS

| | | | | |
|---|---|---|---|---|
| EP | 2071213 A1 | 6/2009 | | |
| EP | 2754889 A1 | 7/2014 | | |
| EP | 3297156 A1 | 3/2018 | | |
| EP | 3614556 A1 | 2/2020 | | |
| EP | 4414552 A1 * | 8/2024 | | H02P 9/14 |
| WO | 9830813 A1 | 7/1998 | | |
| WO | WO-2017092773 A1 * | 6/2017 | | F03D 7/0296 |

OTHER PUBLICATIONS

PCT International Search Report and Written Opinion of The International Searching Authority for Application PCT/DK2023/050107 dated Aug. 14, 2023 (Aug. 14, 2023).

* cited by examiner

| Tm Table | ω1 | ω2 | ω3 | ω4 | . | . | . | ωn |
|---|---|---|---|---|---|---|---|---|
| T1 | Tm11,θ11 | Tm12,θ12 | Tm13,θ13 | Tm14,θ14 | | | . | Tm1n,θ1n |
| T2 | Tm21,θ21 | Tm22,θ22 | Tm23,θ23 | Tm24,θ24 | | | . | Tm2n,θ2n |
| T3 | Tm31,θ31 | Tm32,θ32 | Tm33,θ33 | Tm34,θ34 | | | . | Tm3n,θ3n |
| . | | | | | | | | . |
| . | | | | | | | | . |
| . | | | | | | | | . |
| Tn | Tmn1,θn1 | Tmn2,θn2 | Tmn3,θn3 | Tmn4,θn4 | | | | Tmnn,θnn |

WTG speed

WTG torque

Fig. 8

METHOD FOR HANDLING GEARBOX VIBRATIONS IN A WIND TURBINE

FIELD OF THE INVENTION

The present invention relates to a method for controlling operation of a generator of a wind turbine in a manner which reduces noise originating from gear tooth meshing of a gearbox of the wind turbine.

BACKGROUND OF THE INVENTION

When operating a wind turbine, various movable parts of the wind turbine generate structure-borne vibrations and associated air-borne noise, which may be amplified by various other structures of the wind turbine, such as tower, wind turbine blades, etc. This is sometimes referred to as tonality. This may result in air-borne noise levels in the vicinity of the wind turbine which annoy neighbours or disturb animal life, and the noise may even approach or exceed allowable noise limits. It is therefore desirable to reduce such noise.

One source of wind turbine noise is vibrations originating from operation of the generator. Another source is vibrations originating from the drive train, e.g. from gear tooth meshing in the gearbox. In combination, vibrations originating from the generator and vibrations originating from the drive train constitute vibrations of the power train of the wind turbine, and thereby noise of the wind turbine as a whole.

EP 2 485 388 B1 discloses a method for controlling the operation of an electromechanical transducer, such as an electric generator for a wind turbine. The method comprises determining a harmonic control signal being indicative for a harmonic operational behaviour of the electromechanical transducer. The determining of the harmonic control signal comprises observing at least one value of operational parameters of the electromechanical transducer, and deriving from a database the harmonic control signal as a function of the observed values of the operational parameters of the electromechanical transducer. A modified drive signal is generated based on the determined harmonic control signal, and the generated modified drive signal is supplied to the electromagnetic coils of a stator of the electromechanical transducer.

DESCRIPTION OF THE INVENTION

It is an object of embodiments of the invention to provide a method for controlling operation of a generator for a wind turbine in a manner which reduces noise originating from operation of a gearbox of the wind turbine.

It is a further object of embodiments of the invention to provide a method for controlling operation of a generator for a wind turbine in a manner which reduces noise originating from gear teeth of a gearbox of the wind turbine.

It is an even further object of embodiments of the invention to provide a method for controlling operation of a generator for a wind turbine which allows for easy monitoring of the condition of the wind turbine.

The invention provides a method for controlling operation of a generator for a wind turbine, the method comprising the steps of:
  obtaining a measure for a rotational speed of the generator,
  obtaining a measure for vibrations originating from gear tooth meshing of a gearbox of the wind turbine, at the rotational speed of the generator,
  determining at least one amplitude of a harmonic in the gearbox vibrations,
  generating a torque modulating signal for the generator by:
    selecting an initial phase angle and an initial amplitude, based on the rotational speed of the generator, on initial characteristics of the wind turbine, and on the at least one amplitude of the harmonic in the gearbox vibrations,
    performing an optimization process including adjusting the initial phase angle and the initial amplitude in order to obtain a minimum in amplitude of a resultant vibration of vibrations originating from the gearbox and vibrations originating from the generator, corresponding to the harmonic in the gearbox vibrations, thereby obtaining an adjusted phase angle and an adjusted amplitude, and
    generating a torque modulating signal for the generator specifying the adjusted phase angle and the adjusted amplitude,
  injecting the torque modulating signal into the generator, thereby obtaining operation of the generator resulting in the resultant vibration of vibrations of the gearbox and vibrations of the generator, corresponding to the harmonic in the gearbox vibrations, being minimised, and
  deriving information regarding residual vibrations at the minimised resultant vibration.

Thus, the invention provides a method for controlling operation of a generator for a wind turbine. In the present context the term 'generator' should be interpreted to mean an electromechanical transducer which transforms mechanical movements of the wind turbine into electrical energy.

In the method according to the first aspect of the invention, a measure for a rotational speed of the generator is initially obtained. The rotational speed may be a rotational speed of a low speed shaft or a high speed shaft. In any event, the obtained rotational speed provides information regarding how rotating parts of the drive train rotate, including rotations of meshing gears of the gearbox. The rotational speed may, e.g., be measured, or it may be provided by a controller for the generator.

Next, a measure for vibrations originating from gear tooth meshing of the gearbox of the wind turbine, at the rotational speed of the generator, is obtained. The vibrations may be measured directly at the gearbox, e.g. by means of a suitable vibration sensor, such as an accelerometer, mounted on the gearbox. As an alternative, the vibrations may be measured in an indirect manner, e.g. by measuring vibrations of amplifying parts of the wind turbine, such as the tower and/or the wind turbine blades, induced by the vibrations of the gearbox, and/or by measuring a noise level at a specified distance from the wind turbine.

Next, at least one amplitude of a harmonic in the gearbox vibrations is determined. In the present context the term 'harmonic' should be interpreted to mean vibrations at a frequency which is a fundamental frequency, such as an eigenfrequency or a resonance frequency, of the gearbox system, or which is a positive integer multiple of such a fundamental frequency.

The harmonics of a gearbox are closely related to the design of the gearbox, in particular to the design of various gear stages and the number of gear teeth on the meshing gears, and are dependent on the rotational speed of the gear system. For instance, the vibrations originating from gear tooth meshing define a fundamental frequency which is a non-integer multiple of the rotational speed of the input shaft or the output shaft of the gearbox, and the non-integer ratio depends on the internal components of the gearbox in accordance with standards practice.

The amplitude of the harmonic in the gearbox vibrations represents the level of the noise originating from gear tooth meshing of the gearbox.

Next, a torque modulating signal for the generator is generated. In the present context the term 'torque modulating signal' should be interpreted to mean a control signal which defines an AC torque sinus which can be added on top of a DC power producing torque of the generator. Accordingly, a torque modulating signal being applied to the generator modulates the torque output of the generator.

The torque modulating signal is generated in the following manner. An initial phase angle and an initial amplitude are selected, based on the rotational speed of the generator, on initial characteristics of the wind turbine, and on the at least one amplitude of the harmonic in the gearbox vibrations. The initial characteristics of the wind turbine may, e.g., include design characteristics of the gearbox, such as gear ratio, number of teeth on the gear wheels, etc.

Accordingly, the initial phase angle and the initial amplitude are selected in a manner which takes the rotational speed of the generator and characteristics of the wind turbine which are related to the gearbox design into account. As described above, these two kinds of information can be used for deriving information related to gear tooth meshing, such as a frequency of vibrations originating from gear tooth meshing. Furthermore, the at least one amplitude of the harmonic in the gear box vibrations is taken into account when selecting the initial phase angle and the initial amplitude. Thus, the initial phase angle and the initial amplitude are selected in a manner which at least to some extend is expected to match the vibrations originating from gear tooth meshing of the gearbox.

Next, an optimization process is performed. The optimization process includes adjusting the initial phase angle and the initial amplitude in order to obtain a minimum in amplitude of a resultant vibration of vibrations originating from the gearbox and vibrations originating from the generator, corresponding to the harmonic in the gearbox vibrations. In the present context the term 'resultant vibration' should be interpreted to mean the total vibrations of the power train, i.e. the combination of vibrations originating from the gearbox and the generator, at a frequency corresponding to the harmonic in the gearbox vibrations. The resultant vibration may, thus, be regarded as a superposition of the vibrations originating from the gearbox and the vibrations originating from the generator, at a frequency corresponding to the harmonic in the gearbox vibrations.

Thus, the result of the optimization process is that an adjusted phase angle and an adjusted amplitude are obtained which represent a minimum in the amplitude of the resultant vibration, and thereby in the total vibrations of the power train. Furthermore, the amplitude of the resultant vibration represents a noise level of the noise originating from the entire power train. Therefore, minimising the amplitude of the resultant vibration also minimises the noise generated by the power train, at the source of the noise. Thus, in the optimization process, the optimal phase angle and amplitude, resulting in minimum noise, are 'hunted'.

A torque modulating signal for the generator is then generated, which specifies the adjusted phase angle and the adjusted amplitude. The torque modulating signal thereby also represents a minimum in the amplitude of the resultant vibration. In other words, the torque modulating signal is 'designed' in a manner which matches the vibrations originating from the gear tooth meshing of the gearbox, in the sense that the torque modulating signal, when injected into the generator, causes the generator to operate in a manner which causes vibrations of the generator which to the greatest possible extent cancel out the vibrations originating from gear tooth meshing of the gearbox.

For instance, the torque modulating signal may define a frequency which corresponds to the harmonic in the gearbox vibrations, an amplitude which corresponds to the amplitude of the harmonic in the gearbox vibrations, and a phase angle which ensures a match between the phase angle of the gearbox and the phase angle of the generator.

Next, the torque modulating signal, which was generated in the manner described above, is injected into the generator. Thus, the generator is operated based on the torque modulating signal, i.e. the torque of the generator is modulated in a manner which is specified by the adjusted phase angle and the adjusted amplitude. Accordingly, the generator is operated in a manner which results in the resultant vibration of the vibrations of the gearbox and the vibrations of the generator, corresponding to the harmonic in the gearbox, being minimised, since the vibrations originating from the generator to the greatest possible extent cancel out the vibrations originating from gear tooth meshing of the gearbox.

Thereby the total noise generated by the wind turbine is reduced.

Finally, information regarding residual vibrations at the minimised resultant vibration is derived.

Thus, in addition to optimizing the phase angle and the amplitude of the torque modulating signal, in the sense that the amplitude of the resultant vibration is minimised, information regarding residual vibrations, i.e. what is left of the vibration signal when the generator is operated in accordance with the optimized torque modulating signal, is also derived. Such information may, e.g., be valuable in order to evaluate efficiency of the noise reducing actions, in order to benchmark the wind turbine relative to other wind turbines and/or relative to a model or standard 'ideal' wind turbine. Furthermore, by monitoring the residual vibrations over time, valuable information regarding the condition or the state of the wind turbine, in particular of the power train, may be derived.

In particular, the combination of the residual vibration, the optimized phase angle and the optimized amplitude provides valuable information regarding the condition or the state of the wind turbine. Thus, monitoring these parameters over time may provide information regarding how the system is aging, wearing down, plastically deforming in the drivetrain, and changes in how well the gearbox is connected to the hub, the tower, etc.

The step of injecting the torque modulating signal into the generator may comprise injecting the torque modulating signal into an electronic generator controller. According to this embodiment, the torque modulating signal is supplied to an electronic generator controller, i.e. to a controller which controls operation of the generator. This modulated signal is simply added to the DC quasi-static signal used for the overall generator torque command. This torque command signal is then converted to an appropriate power switching device using well-known electrical machine control methodology. This applies to generator control of an induction or a synchronous machine, but could also apply to motor control.

The step of performing an optimization process may comprise the steps of:
- generating an initial torque modulating signal for the generator specifying the initial phase angle and the initial amplitude,
- injecting the initial torque modulating signal into the generator and operating the generator based on the initial torque modulating signal, while monitoring a resultant vibration of vibrations originating from the gearbox and vibrations originating from the generator, corresponding to the harmonic in the gearbox vibrations, and
- adjusting the phase angle and the amplitude of the torque modulating signal to fit with an actual position of the gearbox as well as with an actual position of the generator, based on the monitored resultant vibration, until a minimum in amplitude of the resultant vibration is reached, thereby obtaining an adjusted torque modulating signal.

According to this embodiment, the optimization process, and thereby the 'hunt' for the optimal phase angle and amplitude of the torque modulating signal, is performed by initially generating an initial torque modulating signal for the generator specifying the initial phase angle and the initial amplitude. The initial torque modulating signal is injected into the generator, and the generator is operated based on the initial torque modulating signal. Thus, the torque of the generator is modulated in a manner which is specified by the initial phase angle and the initial amplitude, and which thereby, at least to some extent, reflects or matches the vibrations originating from gear tooth meshing of the gearbox.

While operating the generator based on the initial torque modulating signal, the resultant vibration of vibrations originating from the gearbox and vibrations originating from the generator, corresponding to the harmonic in the gearbox vibrations, is monitored.

Finally, the phase angle and the amplitude of the torque modulating signal are adjusted to fit with an actual position of the gearbox as well as with an actual position of the generator, and based on the monitored resultant vibration. This is done by adjusting or tuning the phase angle and the amplitude, while monitoring the resultant vibration, and in such a manner that a minimum in amplitude of the resultant vibration is reached. Thus, the optimal phase angle and amplitude of the torque modulating signal are 'hunted'. This results in an adjusted torque modulating signal, specifying the adjusted phase angle and the adjusted amplitude.

The step of deriving information regarding residual vibrations at the minimised resultant vibration may comprise generating a residual vibration map specifying correlated values of phase angle of the torque modulating signal, amplitude of the torque modulating signal and amplitude of the resultant vibration. According to this embodiment, the derived information regarding residual vibrations is in the form of, or includes, a residual vibration map. The residual vibration map specifies correlated values of at least three entities, i.e.:

1. the phase angle of the torque modulating signal
2. the amplitude of the torque modulating signal
3. the amplitude of the resultant vibration Thus, the residual vibration map may be regarded as a three-dimensional map or table which specifies in which manner the three entities mentioned above correlate or depend on each other. For instance, the residual vibration map may specify an amplitude of the resultant vibration which was measured at a given combination of phase angle and amplitude of the torque modulating signal being applied, corresponding to a specific operating point of the wind turbine. Thus, the residual vibration map may be regarded as a response function for a given torque modulating input.

The combination of the three entities identified above together provides more information than any one taken by itself. For instance, reaching the same amplitude of the resultant vibration, but requiring, e.g., 50% of the amplitude of the torque modulating signal to obtain this, indicates a change in the system mechanical structure.

Similarly, a change in the phase angle of the torque modulating signal by itself indicates a change in some critical position element within the entire drivetrain structure. For instance, the generator mounts have stretched differently than the original as built new condition.

The method may further comprise the step of communicating the information regarding residual vibrations at the minimised resultant vibration to an external monitoring system and/or control system.

According to this embodiment, the derived information regarding residual vibrations is not merely applied locally, at the wind turbine, but is also shared with an external monitoring system and/or control system. In the present context the term 'external system' should be interpreted to mean a system which does not form part of the wind turbine being controlled in accordance with the method according to the invention. The external monitoring system and/or control system may, thus, form part of a central monitoring or control facility, a power plant controller (PPC) for controlling wind turbines of a wind farm, a controller of another wind turbine, etc.

By communicating the derived information regarding residual vibrations to an external monitoring system and/or control system, this information, which is obtained during operation of the wind turbine in question, is made available in a broader context, e.g. with the purpose of optimizing operation of other wind turbines, coordinated operation of wind turbines within a wind farm, centralised or remote condition monitoring or performance monitoring, fleet management of wind turbines, for statistical purposes, etc.

In addition, information regarding the optimized phase angle, the optimized amplitude, the rotational speed of the generator and/or the DC torque of the generator may be communicated to the external monitoring system and/or control system.

It should be noted that the communication described above may be two-way communication in the sense that the wind turbine may communicate information regarding the wind turbine to the external monitoring system and/or control system, as well as receive similar information regarding other wind turbines from the external monitoring system and/or control system.

The method may further comprise the step of controlling one or more further wind turbines based on the information regarding residual vibrations at the minimised resultant vibration.

This may, e.g., be obtained by communicating the information regarding residual vibrations directly to a controller of at least one further wind turbine, e.g. a wind turbine arranged in the vicinity, such as within the same wind farm. Thereby the information regarding residual vibrations may be taken directly into account when controlling the at least one further wind turbine. For instance, the information regarding residual vibrations may be applied as a benchmark, and deviations therefrom may be regarded as a sign of degradation or approaching malfunction of the at least one further wind turbine, or one or more components thereof.

As an alternative, the information regarding residual vibrations may be communicated to a power plant controller (PPC) of a wind farm in which the wind turbine is arranged. In this case the PPC may apply the received information regarding residual vibrations in a coordinated control of the wind turbines of the wind farm.

As another alternative, the information regarding residual vibrations may be communicated to a central facility, such as a monitoring and/or control facility applied for monitoring and/or controlling a plurality of wind farms, i.e. a fleet of wind farms, a data collection facility, such as a SCADA system, or any other suitable kind of central facility. In this case the information regarding residual vibrations may be applied for statistical purposes and/or for making use of experience from some wind turbines when controlling other wind turbines within a fleet. Furthermore, information regarding residual vibrations received from several wind turbines may be applied for deriving a benchmark vibration signature or a standard vibration signature, which can, e.g., be applied when new similar wind turbines are put into operation.

The method may further comprise the step of communicating the torque modulating signal and/or the adjusted phase angle and/or the adjusted amplitude to a monitoring system and/or control system.

According to this embodiment, the torque modulating signal which is eventually injected into the generator, and/or at least the phase angle and/or the amplitude of this torque modulating signal, is further communicated to a monitoring system and/or control system, i.e. to a system which is applied for monitoring and/or controlling the wind turbine, and possibly one or more further wind turbines.

In the case that the torque modulating signal is communicated to a monitoring system, the monitoring system may, e.g., be applied for monitoring the condition of the wind turbine. For instance, the monitoring system may be applied for detecting any signs of approaching wear, failure, fatigue, etc., of various components or sensors of the wind turbine. Alternatively or additionally, the monitoring system may be applied for monitoring the performance of the wind turbine.

The vibrational signature of the gearbox, in particular changes in the vibrational signature of the gearbox, may provide information regarding the condition of the wind turbine. For instance, if a component of the wind turbine is degrading, this may give rise to a change in the vibrations generated by the wind turbine, e.g. in the vibrations originating from gear tooth meshing of the gearbox. For instance, the location of any tonality sensitive resonances may change. Such a change in vibrations will further cause a change in the phase angle and/or the amplitude of the torque modulating signal being injected into the generator, in order to maintain the resultant vibration at a minimum. By communicating the torque modulating signal, the phase angle and/or the amplitude of the adjusted torque modulating signal to the monitoring system, the monitoring system is enabled to detect such a change in the vibrational signature of the gearbox, and thereby to react on it. Similar variances in the vibrational signature of the gearbox may be caused by changes in seasonal conditions.

In particular, the combination of information regarding the residual vibration, in particular the amplitude of the minimal residual vibration, the amplitude and the phase angle of the torque modulating signal providing the minimal residual vibration, and the DC operating point of the wind turbine provides valuable information regarding the condition, health or performance of the system.

The monitoring system may be internal, in the sense that it is adapted for monitoring only the wind turbine. As an alternative, it may be external, in the sense that it is arranged externally with respect to the wind turbine, e.g. at a power plant controller (PPC) or a central facility. In the latter case, the torque modulating signal may be applied for fleet monitoring and/or statistical purposes.

In the case that the torque modulating the signal is communicated to a control system, this control system may be the control system of the wind turbine, or it may be an external control system, such as a power plant controller (PPC) or a central control facility, as described above. In the latter case, the torque modulating signal may further be taken into account during control of one or more further wind turbines, similarly to the situation described above.

The method may further comprise the steps of providing the information regarding residual vibrations at the minimised resultant vibration to a continuous monitoring system of the wind turbine, and monitoring the condition of the wind turbine by means of the continuous monitoring system and based at least partly on the information regarding residual vibrations at the minimised resultant vibration.

According to this embodiment, the residual vibrations are continuously monitored, and thereby a possible development of the residual vibrations as a function of time may be derived. Such information may be valuable with regard to monitoring the condition of the wind turbine.

For instance, if the residual vibrations change as a function of time, e.g. in such a manner that an amplitude of the residual vibrations increases, this may be an indication that the vibrational signature of the gearbox is changing, and this may be a sign that one or more components of the wind turbine may be degrading, as described above. Accordingly, monitoring the residual vibrations may provide an early warning of possibly approaching degrading or malfunction components of the wind turbine.

The step of selecting an initial phase angle and an initial amplitude may comprise selecting at least an amplitude from a look-up table. According to this embodiment, a look-up table may be generated, e.g. empirically and/or by means of theoretical calculations. The look-up table may specify appropriate amplitudes for the torque modulating signal for appropriate combinations of design specifics of the wind turbine, in particular of the gearbox, the rotational speed of the generator and the amplitude of the harmonic in the gearbox vibrations. Thereby the initial amplitude is a qualified guess on an optimal amplitude, resulting in a minimisation of the amplitude of the resultant vibration. This makes the 'hunting process' described above faster and more accurate.

Furthermore, the initial phase angle may also be selected from the look-up table. As an alternative, the initial phase angle may be selected arbitrarily, and the 'correct' phase angle may be identified by means of the 'hunting process' described above.

The method may further comprise the step of updating the look-up table, based on the adjusted phase angle and/or the adjusted amplitude of the adjusted torque modulating signal.

According to this embodiment, the look-up table is continuously adjusted and improved, based on the adjusted phase angle and/or the adjusted amplitude, and thereby based on values of the phase angle and the amplitude which actually result in a minimisation of the amplitude of the resultant vibration. Thereby the initial phase angle and/or the initial amplitude selected at future occasions will be more accurate. This is sometimes referred to as a feed-forward control with self tuning.

As an alternative to selecting the initial phase angle and/or the initial amplitude from a look-up table, the initial phase angle and/or the initial amplitude may be selected in any other suitable manner, e.g. based on calculations performed in real-time or nearly real-time.

The step of obtaining a measure for vibrations originating from gear tooth meshing of the gearbox may comprise measuring vibrations of the gearbox by means of at least one sensor.

According to this embodiment, the gearbox vibrations are measured directly, e.g. by means of one or more suitable sensors mounted on or connected to the gearbox. Suitable sensors include, but are not limited to, accelerometers, high fidelity strain gauges, displacement sensors, or any other suitable kind of sensor which provides a signal from which the amplitude of the harmonic in the gearbox vibrations can be derived or isolated.

Alternatively or additionally, the measure for vibrations from gear tooth meshing of the gearbox may be obtained in an indirect manner, e.g. by measuring vibrations of large wind turbine components being affected by the vibrations of the gearbox, e.g. the tower and/or the wind turbine blades, or by measuring a noise level and its associated spectrum at a specified distance from the wind turbine.

The measured input related to the resultant vibration may originate from two or more sensors, e.g. positioned at separate positions and/or being of different types. In this case the measured input may be handled separately, in the sense that each measured input forms part of a separate processing channel for performing the 'hunting' process described above. Thus, the separate processing channels may operate in parallel, i.e. independently of each other, and based on their respective measured input. This results in two or more torque modulating signals being generated, one for each processing channel. The two or more torque modulating signals may then be added, in order to obtain a resultant torque modulating signal, which is then injected into the generator.

The respective 'hunting' processes may take place in the frequency domain, while the adding of the torque modulating signals may take place in the time domain.

The respective torque modulating signals may be multiplied by appropriate weights before they are added to each other. The respective weights may, e.g., reflect the importance, significance, reliability, etc., of the respective corresponding sensors. Accordingly, a more important or more reliable sensor may be provided with a higher weight than a sensor which is less important or considered less reliable.

The weights may be in the form of weight functions, e.g. depending on the frequency level, average torque and/or power level of the wind turbine. For instance, a first sensor may be provided with a higher weight than a second sensor for measurements within a first frequency range, average torque and/or power level, whereas the opposite may be the case within a second frequency range, average torque and/or power level. This may reflect that some of the sensors are most important or reliable within some frequency ranges, average torque and/or power levels, whereas other sensors are most important or reliable within other frequency ranges, average torque and/or power levels. Thereby, the sensor which is most important or reliable at a relevant frequency, average torque and/or power level will be given the highest weight when the resultant torque modulating signal is formed.

The method may further comprise the step of continuously performing the optimization process in order to maintain the amplitude of the resultant vibration at a minimum.

According to this embodiment, the 'hunting process' for optimal phase angle and amplitude is continuously performed while operating the wind turbine. Thereby it is ensured that, even if something in the system drifts or changes, a minimal amplitude of the resultant vibration is maintained.

The method may further comprise the steps of:
determining at least one amplitude of at least one further harmonic in the gearbox vibrations,
selecting an initial phase angle and an initial amplitude, based on the rotational speed of the generator, on initial characteristics of the wind turbine, and on the at least one amplitude of the at least one further harmonic in the gearbox vibrations,
performing an optimization process including adjusting the initial phase angle and the initial amplitude in order to obtain a minimum in amplitude of a resultant vibration of vibrations originating from the gearbox and vibrations originating from the generator, corresponding to the at least one further harmonic in the gearbox vibrations, thereby obtaining an adjusted phase angle and an adjusted amplitude, and
generating a further torque modulating signal for the generator specifying the adjusted phase angle and the adjusted amplitude,
wherein the step of injecting the torque modulating signal into the generator comprises adding the adjusted torque modulating signal and the further torque modulating signal(s), thereby obtaining a resultant torque modulating signal, and injecting the resultant torque modulating signal into the generator.

According to this embodiment, at least one further harmonic in the gearbox vibrations is made the subject of the process of reducing the noise originating from gear tooth meshing of the gearbox by injecting an appropriate torque modulating signal into the generator, in the manner described above. Thereby two or more harmonics in the gearbox vibrations can be addressed and handled simultaneously.

The harmonics are handled separately, in the sense that separate torque modulating signals are generated for each harmonic, in such a manner that the resultant vibration corresponding to the respective harmonic is minimised. The torque modulating signals generated in this manner are then added to each other, thereby obtaining a resulting torque modulating signal, which is then injected into the generator. Thus, the resulting torque modulating signal ensures that the resultant vibrations corresponding to all of the handled harmonics are minimised. Furthermore, handling the harmonics separately and subsequently adding the generated torque modulating signals is an easy manner of obtaining this.

The step of obtaining a measure for vibrations originating from gear tooth meshing of the gearbox may comprise obtaining measurements from at least two sensors, and each sensor may provide measurements related to a separate harmonic in the gearbox vibrations.

According to this embodiment, the harmonics are handled via two completely separate channels, since each of the torque modulating signals are generated based on measurements provided by a separate sensor. Thereby measurements related to one harmonic does not interfere with measurements related to any of the other harmonics. Accordingly, it can be easily ensured that a true minimum in the resultant vibrations corresponding to each harmonic is reached.

As an alternative, measurements from a given sensor may relate to two or more harmonics.

BRIEF DESCRIPTION OF THE DRAWINGS

The invention will now be described in further detail with reference to the accompanying drawings in which FIG. 8 is a table illustrating optimum values for phase angle and amplitude for a torque modulating signal at various operating points of a wind turbine.

DETAILED DESCRIPTION OF THE DRAWINGS

Figure 1:
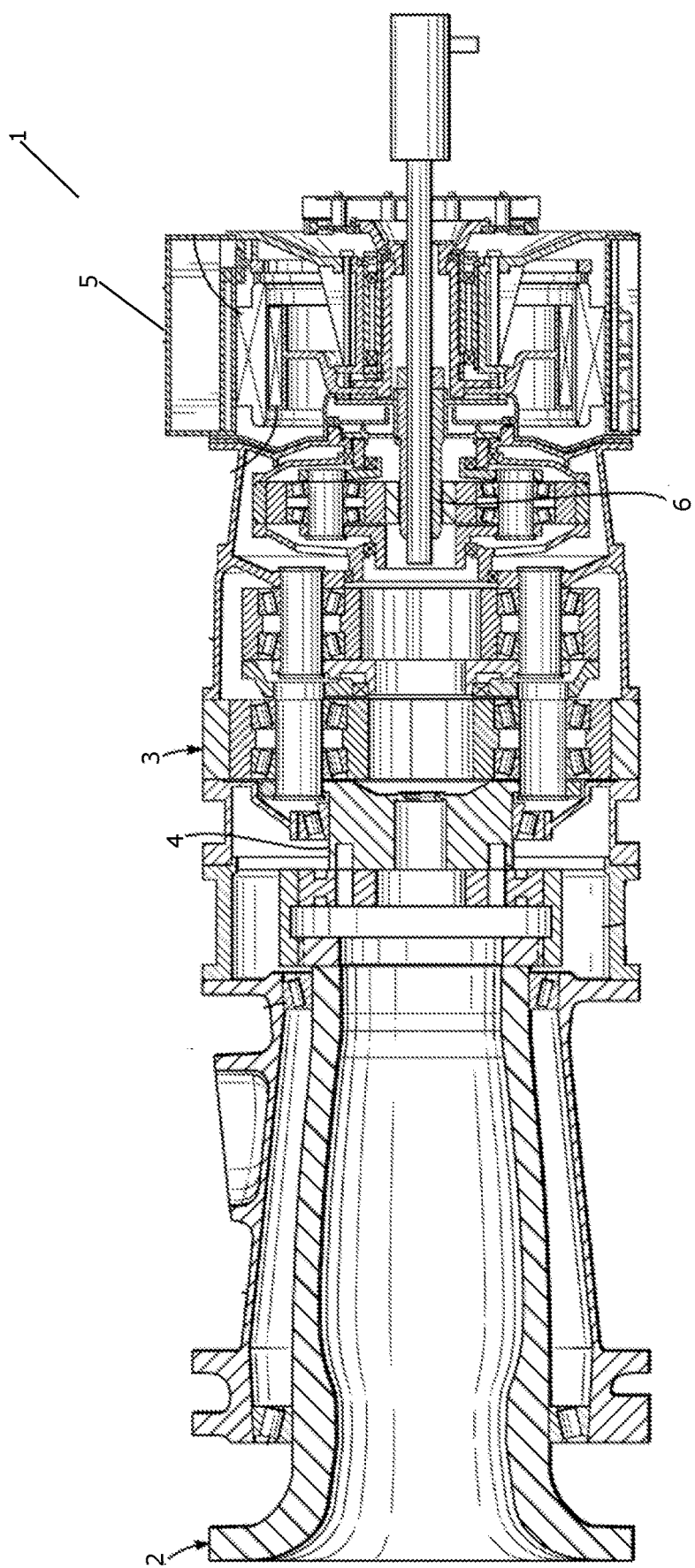
FIG. 1 is a cross sectional view of a power train of a wind turbine, being controlled in accordance with a method according to an embodiment of the invention.

FIG. 1 is a cross sectional view of a power train 1 of a wind turbine being controlled in accordance with a method according to an embodiment of the invention. The power train 1 comprises a main shaft 2 connected to a rotor (not shown) of the wind turbine, a gearbox 3 connected to the main shaft 2 via an input shaft 4, and a generator 5 connected to the gearbox 3 via an output shaft 6.

The generator 5 is controlled in such a manner that an amplitude of the total vibrations of the power train 1, in the form of a resultant vibration of vibrations originating from gear tooth meshing of the gearbox 3 and vibrations originating from the generator 5, is minimised.

This is obtained by obtaining a measure for a rotational speed of the generator 5, e.g. in the form of a rotational speed of the input shaft 4 or in the form of a rotational speed of the output shaft 6. Furthermore, vibrations originating from gear tooth meshing of the gearbox 3, at the rotational speed, are measured, and a frequency and an amplitude of at least one harmonic in the gearbox vibrations are determined.

A torque modulating signal for the generator 5 is then generated in the following manner. First, an initial phase angle and an initial amplitude are selected, which may be expected to match the vibrations of the gearbox 3. For instance, at least the initial amplitude may be selected from a look-up table. An optimization process is then performed, e.g. in the following manner. An initial torque modulating signal for the generator 5 is generated, specifying the initial phase angle and the initial amplitude, and the initial torque modulating signal is injected into the generator 5.

Accordingly, the generator 5 is operated based on the initial torque modulating signal, and thereby in accordance with the initial phase angle and the initial amplitude. During this, a resultant vibration of the power train 1, corresponding to the harmonic in the gearbox vibrations, is monitored. Furthermore, the phase angle and the amplitude of the torque modulating signal are adjusted to fit an actual position of the gearbox 3 as well as an actual position of the generator 5, and based on the monitored resultant vibrations, until a minimum in amplitude of the resultant vibration is reached. Thereby an adjusted torque modulating signal for the generator 5 is obtained, which specifies the adjusted phase angle and the adjusted amplitude.

The adjusted torque modulating signal is then injected into the generator 5. Thereby the generator 5 is operated in such a manner that the resultant vibration of the power train 1, corresponding to the harmonic of the gearbox vibrations, has a minimal amplitude. Thereby the noise generated by the power train 1 is also minimised.

Furthermore, information regarding residual vibrations at the minimised resultant vibration is derived, in the manner described above.

Figure 2:
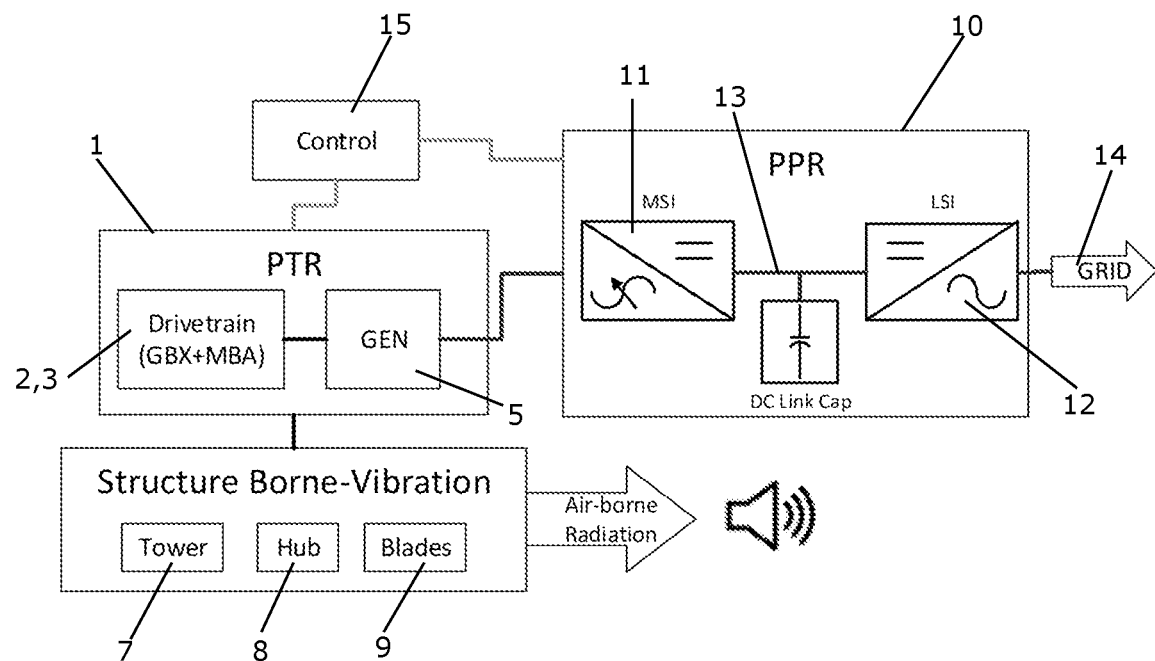
FIGS. 2 and 3 are diagrams illustrating a wind turbine being controlled in accordance with a method according to an embodiment of the invention.

FIG. 2 is a diagrammatic view of a power generating part of a wind turbine being controlled in accordance with a method according to an embodiment of the invention. FIG. 2 illustrates a power train 1 of the wind turbine, including a drivetrain with a main shaft 2 and a gearbox 3, and a generator 5. The power train 1 is mechanically connected to large structures of the wind turbine, in the form of tower 7, hub 8 and wind turbine blades 9. These large structures amplify vibrations of the power train 1, and thereby emit air-borne noise to the surroundings.

The generator 5 is further connected to an electrical power production system 10 comprising a turbine side AC/DC converter 11 and a grid side DC/AC converter 12, being interconnected by a DC link 13. The AC output of the grid side converter 12 is connected to a power grid 14.

The power train 1 and the electrical power production system 10 are controlled by means of a generator controller 15. Vibrations originating from gear tooth meshing of the gearbox 3 are measured, and based thereon a torque modulating signal for the generator 5 is generated, by the generator controller 15, e.g. in the manner described above with reference to FIG. 1. The generator controller 15 then controls the electrical power production system 10 in accordance with the torque modulating signal, thereby controlling the torque of the generator 5 in such a manner that the amplitude of the resultant vibration of the power train 1 is minimised. Thereby the air-borne noise emitted by the tower 7, the hub 8 and the wind turbine blades 9 is also minimised.

Figure 3:
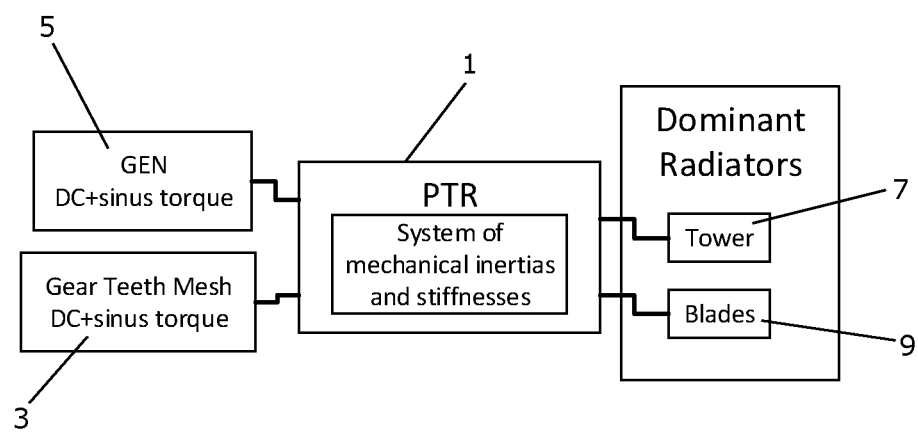

FIG. 3 is a diagrammatic view of parts of a wind turbine being controlled in accordance with a method according to an embodiment of the invention, similar to the wind turbine illustrated in FIG. 2. FIG. 3 illustrates the power train 1, the gearbox 3, the generator 5, the tower 7 and the wind turbine blades 9. More particularly, FIG. 3 illustrates that the generator 5 is operated in such a manner that the vibrations originating from gear tooth meshing of the gearbox 3 and the vibrations originating from the generator 5 to the greatest possible extent cancel out, resulting in a minimisation of the air-borne noise emitted by the tower 7 and the wind turbine blades 9.

Figure 4:
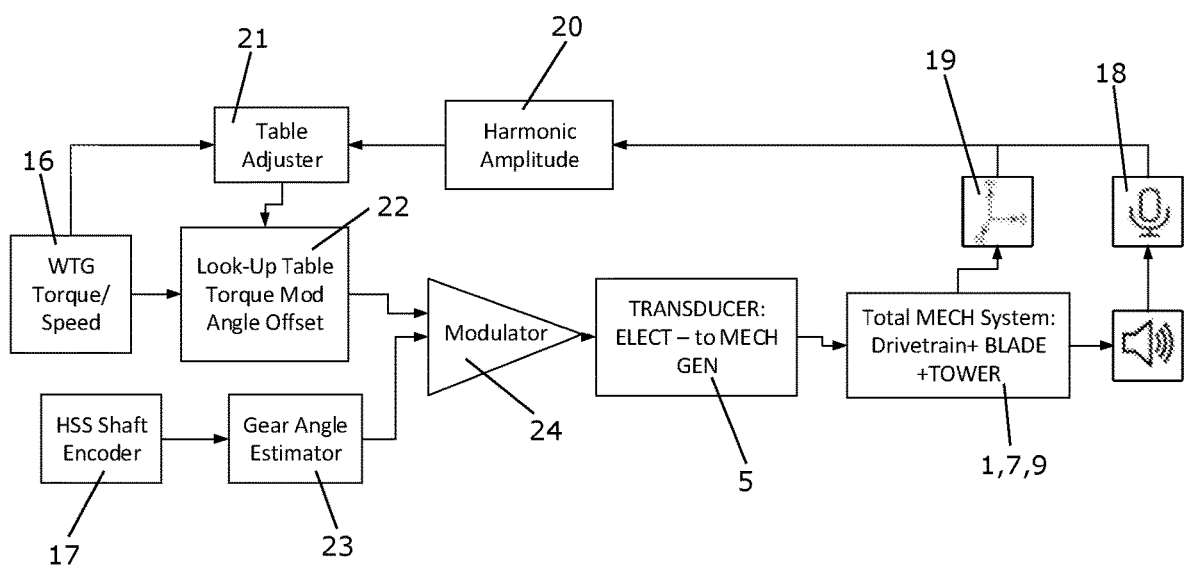
FIG. 4 is a block diagram illustrating a method according to an embodiment of the invention.

FIG. 4 is a block diagram illustrating a method according to an embodiment of the invention.

A measure for a rotational speed of the generator 5 is obtained by means of a torque/speed sensor 16 and a high speed shaft encoder 17. Furthermore, a measure for vibrations originating from gear tooth meshing of the gearbox 3 is obtained by means of a noise sensor 18 and a vibration sensor 19 mounted on the drivetrain. An amplitude 20 of a harmonic in the gearbox vibrations is determined and supplied to a table adjuster 21 which updates a look-up table 22 based thereon.

Based on the output from the torque/speed sensor 16 and the high speed shaft encoder 17, a phase angle and an amplitude are selected, using the look-up table 22 and a gear angle estimator 23. The phase angle and the amplitude are supplied to a modulator 24, which generates a torque modulating signal which specifies the selected phase angle and the selected amplitude, and the torque modulating signal is injected into the generator 5. Accordingly, the generator 5 is operated in accordance with the torque modulating signal, and thereby in accordance with the specified phase angle and amplitude. This causes the generator 5 to operate in a manner which matches the operation of the gearbox 3 in the sense that vibrations originating from gear tooth meshing of the gearbox 3 and vibrations originating from the generator 5 cancel out to the greatest possible extent, thereby minimising an amplitude of a resultant vibration of the power train.

The phase angle and the amplitude of the torque modulating signal may be continuously adjusted, based on measurements of the noise sensor 18 and/or the vibration sensor 19, until a minimum in amplitude of the resultant vibration is obtained, e.g. in the manner described above with reference to FIG. 1.

Figure 5:
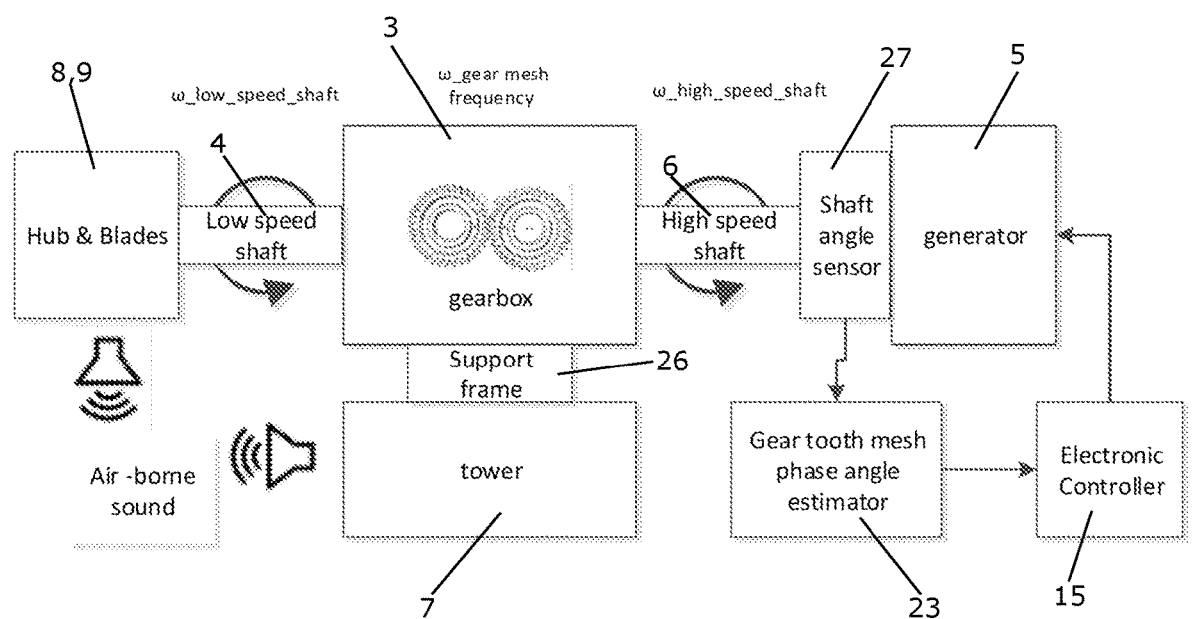
FIG. 5 illustrates a power generating part of a wind turbine being controlled in accordance with a method according to a further embodiment of the invention.

FIG. 5 illustrates a power generating part of a wind turbine being controlled in accordance with a method according to a further embodiment of the invention. FIG. 5 shows a gearbox 3 connected to a hub 8 and wind turbine blades 9 via a low speed input shaft 4 and to a generator 5 via a high speed output shaft 6. The gearbox 3 is further structurally connected to a tower 7 via a support frame 26. The wind turbine blades 9 and the tower 7 amplify vibrations of the gearbox 3, thereby creating airborne noise, as described above.

The wind turbine illustrated in FIG. 5 is controlled essentially as described above with reference to FIGS. 1-4, in order to minimise the noise emitted by the tower and the wind turbine blades 9, and originating from gear tooth meshing. The remarks set forth in this regard are therefore equally applicable here.

A shaft angle sensor 27 measures a shaft angle of the high speed shaft 6, thereby keeping track of the phase angle of the high speed shaft 6 over time. The output of the shaft angle sensor 27 is supplied to a gear angle estimator 23.

Based thereon, the gear angle estimator 23 estimates a phase angle and supplies this to a generator controller 15. The generator controller 15 generates a torque modulation signal for the generator 5, which specifies the estimated phase angle. The gear angle estimator 23 repeatedly adjusts the estimated phase angle, based on input from the shaft angle sensor 27, and in order to minimise a phase angle offset between the phase angle of the high speed shaft 6 and the phase angle of the gear tooth meshing of the gearbox 3, thereby minimising the resultant vibration.

The ratios between the low speed shaft 4, the high speed shaft 6 and the frequency of the gear tooth meshing are fixed and determined by the mechanical design of the gearbox 3. However, the ratio between the high speed shaft 6 and the gear tooth meshing is non-integer. Therefore, the gear angle estimator 23 needs to synthesize an angle which will require several complete revolutions of the high speed shaft 6 before the gear tooth pattern repeats itself, and which stays aligned with observable shaft angles of the gearbox 3.

This is obtained by means of a phase-locked loop, which periodically realigns the shaft angle of the output shaft 6 and the phase angle of the gear tooth meshing, in order to prevent drifting out of synchronism. According to the invention, this is done without knowledge or measurement of the phase angle of the gear tooth meshing, but purely by observing the resultant vibration.

Instead, the shaft angle sensor 27 keeps track of where the phase angle of the high speed shaft 6 starts, and the gear angle estimator 23 and the generator controller 15 generate a torque modulating signal which is synchronized with the phase angle of the gear tooth meshing. The phase angle offset is unknown, but by adjusting the internal offset until the observable resultant vibration has reached a minimum, synchronization is obtained.

Furthermore, information regarding residual vibrations at the minimum resultant vibration is derived, in the manner described above.

Figure 6:
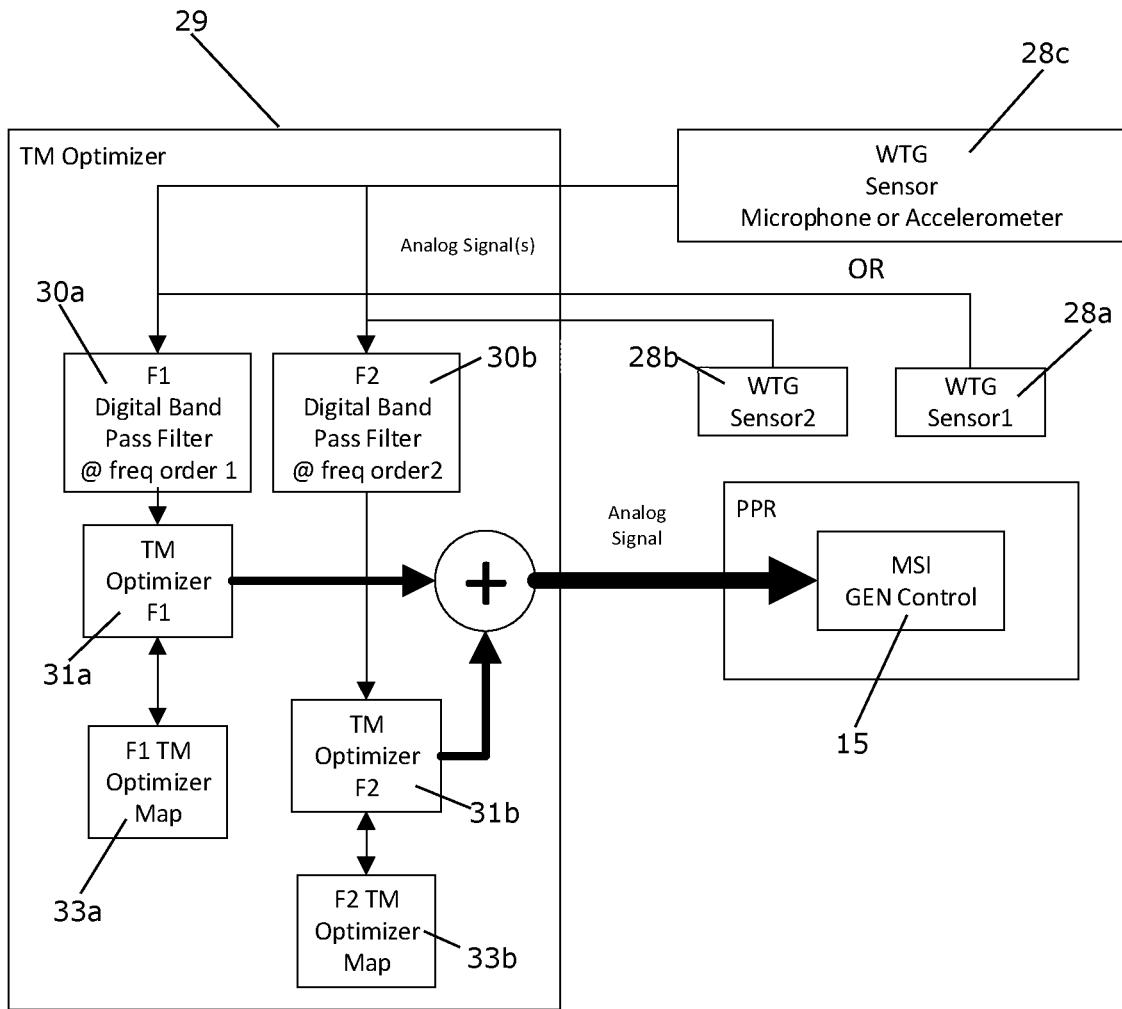
FIGS. 6 and 7 are block diagrams illustrating a method according to two embodiments of the invention.

FIG. 6 is a block diagram illustrating a method according to an embodiment of the invention. Vibrations of a wind turbine, e.g. in the form of resultant vibrations of vibrations of the gearbox and vibrations of the generator, are measured by means of suitable sensors 28, and the measured signals are supplied to a torque modulation optimizer module 29. More particularly, the measured signals are supplied to a first digital band pass filter 30a and to a second digital band pass filter 30b. The digital band pass filters 30a, 30b are designed to allow two different frequency bands to pass, corresponding to two different harmonics in the gearbox vibrations.

The first digital band pass filter 30a may receive measurements only from a first sensor 28a, or set of sensors 28a, while the second digital band pass filter 30b receives measurements only from a second sensor 28b, or set of sensors 28b. In this case handling of the two harmonics is completely separated in two distinct and parallel channels. As an alternative, both digital band pass filters 30a, 30b may receive measurements from the same sensor 28c, or set of sensors 28c.

The band pass filtered signals are supplied to respective torque modulation optimizers 31a, 31b, where respective torque modulating signals, specifying respective phase angles and amplitudes, are generated in the manner described above, i.e. in such a manner that a resultant vibration of vibrations of the gearbox and vibrations of the generator, corresponding to the respective harmonics, is minimised.

The two torque modulating signals are added to each other at adder 32, thereby obtaining a resultant torque modulating signal, which is supplied to a generator controller 15 for injection into the generator. Furthermore, respective torque modulation optimizer maps 33a, 33b are generated.

Thus, in the embodiment illustrated in FIG. 6, two harmonics are handled simultaneously, and via two separate channels, represented by the separate digital band pass filters 30a, 30b and torque modulation optimizers 31a, 31b, and the resultant torque modulating signal ensures minimised resultant vibrations corresponding to both harmonics. It should be noted that the concept illustrated in FIG. 6 could be expanded to include further channels, representing further harmonics in the gearbox vibrations, thereby allowing for simultaneous handling of three or more harmonics in the gearbox vibrations.

Furthermore, information regarding residual vibrations at the minimised resultant vibration is derived, e.g. from the torque modulation optimizer maps 33a, 33b.

Figure 7:
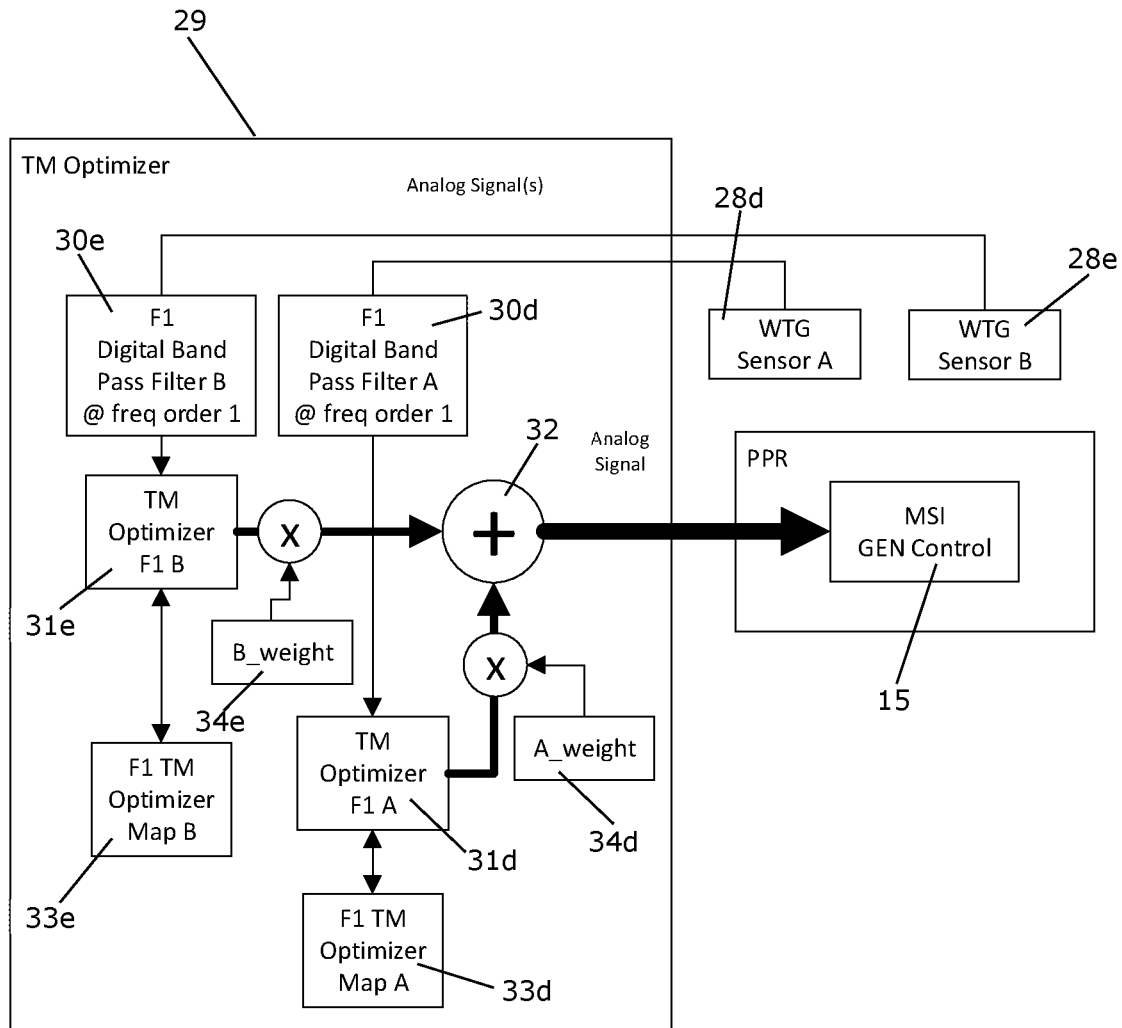

FIG. 7 is a block diagram illustrating a method according to an alternative embodiment of the invention. Similarly to the embodiment illustrated in FIG. 6, vibrations of a wind turbine are measured by means of appropriate sensors 28d, 28e, and the measured signals are supplied to a torque modulation optimizer module 29.

More particularly, measured signals from sensor 28d are supplied to digital band pass filter 30d, while measured signals from sensor 28e are supplied to digital band pass filter 30e. Contrary to the embodiment illustrated in FIG. 6, the digital band pass filters 30d, 30e illustrated in FIG. 7 are designed to allow the same frequency band to pass, i.e. the band pass filters 30d, 30e handle the same harmonic, but based on measurements from different sensors 28d, 28e.

Similarly to the embodiment illustrated in FIG. 6, the band pass filtered signals are supplied to respective torque modulation optimizers 31d, 31e, where respective torque modulating signals, specifying respective phase angles and amplitudes, are generated, in the manner described above. The torque modulating signals are multiplied by a suitable weighting factor 34d, 34e before they are added to each other at adder 32 in order to obtain a resultant torque modulating signal to be supplied to the generator controller 15, as described above.

The weighting factors 34d, 34e may be selected in such a manner that they reflect importance, significance, reliability, etc., of the respective corresponding sensors 28d, 28e.

Thus, in the embodiment illustrated in FIG. 7, one harmonic is handled via two separate and parallel channels, each channel relying on measurements from a separate sensor 28d, 28e.

Furthermore, information regarding residual vibrations at the minimised resultant vibration is derived, e.g. from the torque modulation optimizer maps 33d, 33e.

FIG. 8 is a table illustrating optimum values for phase angle and amplitude for a torque modulating signal at various operating points of a wind turbine. More particularly, the table of FIG. 8 lists combinations of wind turbine torque, $T_i$, and rotational speed of the generator, $\omega_i$, each combination representing an operating point of the wind turbine. For each operating point, an optimal torque modulating signal is listed, represented by an optimal amplitude, $Tm_{ij}$, and an optimal phase angle, $\theta_{ij}$. The amplitudes, $Tm_{ij}$, and phase angles, $\theta_{ij}$, have been identified in an optimisation process according to the invention, and as described above. Accordingly, they represent a torque modulating signal which will result in minimisation of a resultant vibration of vibrations of the gearbox and vibrations of the generator, when injected into the generator.

The table of FIG. 8 may be applied as a look-up table for selecting an appropriate torque modulating signal during operation of the wind turbine. The table of FIG. 8 can also be seen as an example of the look-up table, provided to a newly installed wind turbine, where a model specific look-up table is used as an initial table. The turbine specific table will then evolve over time as the table get tuned and the turbine components are exposed to wear.

The table illustrated in FIG. 8 could further include, for each entry in the table, values of the amplitude of the residual vibration and/or values of the order of the gear tooth meshing vibration being mitigated. For instance, the tonality performance of the wind turbine may depend on which order of the gear tooth meshing or planetary carrier is the most significant. Even though the gear tooth meshing, the planet number, etc. are fixed numbers, the specific eigenfrequency order being most significant may be a function of torque and rotational speed of the operating point of the wind turbine. However, the order of the gear tooth meshing defines the multiplier to be applied when deriving the frequency from the rotational speed of the generator.

Figure 9:
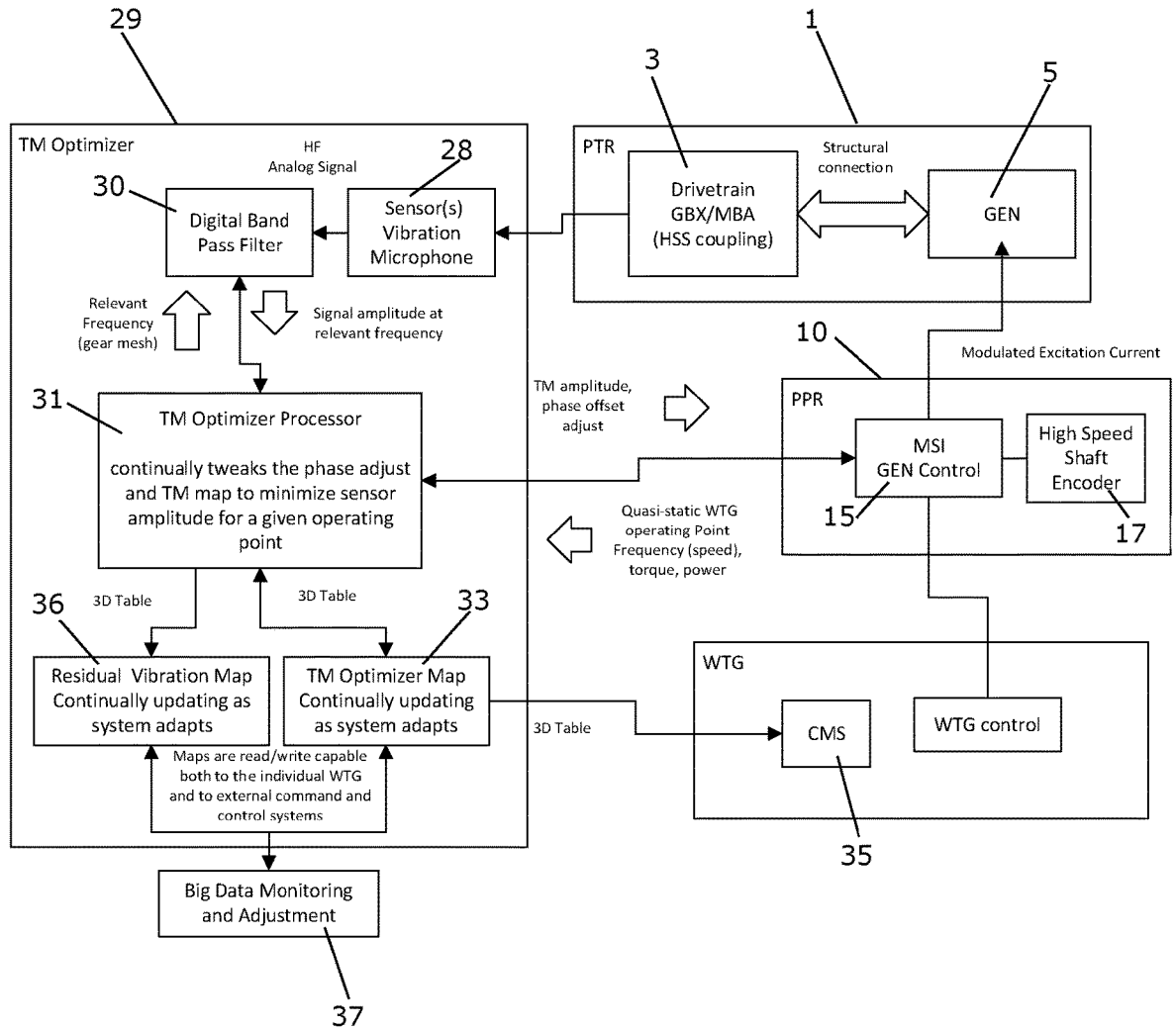
FIG. 9 is a block diagram illustrating a method according to a further embodiment of the invention.

FIG. 9 is a block diagram illustrating a method according to a further embodiment of the invention. Similarly to the embodiments illustrated in FIGS. 6 and 7, vibrations originating from a power train 1 of a wind turbine are measured by means of suitable sensors 28. The measured vibrations may include a resultant vibration of vibrations originating from the gearbox 3 and vibrations originating from the generator 5. Furthermore, vibrations originating from gear tooth meshing of the gearbox 3 may be measured.

The measured signals are supplied to a digital band pass filter 30 being designed to allow a specified frequency band to pass, corresponding to a harmonic in the gearbox vibrations.

The band pass filtered signals are supplied to a torque modulation optimizer 31, where a torque modulating signal, specifying a phase angle and an amplitude, is generated using an optimization process as described above, i.e. in such a manner that an amplitude of a resultant vibration of vibrations of the gearbox 3 and vibrations of the generator 5, corresponding to the harmonic, is minimised.

The torque modulating signal is supplied to a generator controller 15 for injection into the generator 5, and the generator controller 15 controls the generator 5 in accordance therewith. Accordingly, the wind turbine is operated in such a manner that the resultant vibration is minimised, thereby minimising the noise originating from the power train 1 of the wind turbine.

Furthermore, a torque modulation optimizer map 33 is generated and supplied to a continued monitoring system 35 of the wind turbine. Thereby the torque modulation optimizer map 33 is applied during condition monitoring of the wind turbine, e.g. in order to allow for early warning in the case of approaching possible degradation or failure of one or more components of the wind turbine, as described above.

Furthermore, information regarding residual vibrations at the minimised resultant vibration is derived, in the form of a residual vibration map 36. The residual vibration map 36 specifies correlated values of phase angle of the torque modulating signal, amplitude of the torque modulating signal and amplitude of the resultant vibration. Accordingly, the residual vibration map 36 may be regarded as a three-dimensional map or table which specifies in which manner the three entities mentioned above correlate or depend on each other. For instance, the residual vibration map 36 may specify an amplitude of the resultant vibration which is measured at a given combination of phase angle and amplitude of the torque modulating signal being applied, corresponding to a specific operating point of the wind turbine, and it may extend across all relevant operating points of the wind turbine. Thus, the residual vibration map 36 may be regarded as a response function for a given torque modulating input.

The torque modulation optimizer map 33 as well as the residual vibration map 36 is communicated to an external monitoring system 37. The external monitoring system 37 may, e.g., be in the form of a power plant controller (PPC) for controlling wind turbines within a wind farm, or in the form of a central facility which collects data from a vast number of wind turbines, e.g. from a plurality of wind farms. The external monitoring system 37 may, e.g., monitor wind turbines over time and throughout a wind farm or even an entire fleet.

Thereby the torque modulation optimizer map 33 and the residual vibration map 36 are made available externally, e.g. in order to provide optimized operation of wind turbines at wind farm level, or even at fleet level. Furthermore, the information may be used for statistical purposes.

The invention claimed is:

1. A method for controlling operation of a generator for a wind turbine, the method comprising:
obtaining a measure for a rotational speed of the generator, obtaining a measure for vibrations originating from gear tooth meshing of a gearbox of the wind turbine, at the rotational speed of the generator, determining at least one amplitude of a harmonic in the gearbox vibrations, generating a torque modulating signal for the generator by:

selecting an initial phase angle and an initial amplitude, based on the rotational speed of the generator, on initial characteristics of the wind turbine, and on the at least one amplitude of the harmonic in the gearbox vibrations, performing an optimization process including adjusting the initial phase angle and the initial amplitude in order to obtain a minimum in amplitude of a resultant vibration of vibrations originating from the gearbox and vibrations originating from the generator, corresponding to the harmonic in the gearbox vibrations, thereby obtaining an adjusted phase angle and an adjusted amplitude, and generating a torque modulating signal for the generator specifying the adjusted phase angle and the adjusted amplitude, injecting the torque modulating signal into the generator, thereby obtaining operation of the generator resulting in the resultant vibration of vibrations of the gearbox and vibrations of the generator, corresponding to the harmonic in the gearbox vibrations, being minimised, and deriving information regarding residual vibrations at the minimised resultant vibration.

2. The method according to claim 1, wherein the performing an optimization process comprises:

generating an initial torque modulating signal for the generator specifying the initial phase angle and the initial amplitude, injecting the initial torque modulating signal into the generator and operating the generator based on the initial torque modulating signal, while monitoring a resultant vibration of vibrations originating from the gearbox and vibrations originating from the generator, corresponding to the harmonic in the gearbox vibrations, and adjusting the phase angle and the amplitude of the torque modulating signal to fit with an actual position of the gearbox as well as with an actual position of the generator, based on the monitored resultant vibration, until a minimum in amplitude of the resultant vibration is reached, thereby obtaining an adjusted torque modulating signal.

3. The method according to claim 1, wherein deriving information regarding residual vibrations at the minimised resultant vibration comprises generating a residual vibration map specifying correlated values of phase angle of the torque modulating signal, amplitude of the torque modulating signal and amplitude of the resultant vibration.

4. The method according to claim 1, further comprising communicating the information regarding residual vibrations at the minimised resultant vibration to an external monitoring system and/or control system.

5. The method according to claim 4, further comprising controlling one or more further wind turbines based on the information regarding residual vibrations at the minimised resultant vibration.

6. The method according to claim 1, further comprising communicating the torque modulating signal and/or the adjusted phase angle and/or the adjusted amplitude to a monitoring system and/or control system.

7. The method according to claim 1, further comprising providing the information regarding residual vibrations at the minimised resultant vibration to a continuous monitoring system of the wind turbine, and monitoring the condition of the wind turbine by means of the continuous monitoring system and based at least partly on the information regarding residual vibrations at the minimised resultant vibration.

8. The method according to claim 1, wherein selecting the initial phase angle and the initial amplitude comprises selecting at least an amplitude from a look-up table.

9. The method according to claim 1, wherein obtaining the measure for vibrations originating from gear tooth meshing of the gearbox comprises measuring vibrations of the gearbox by means of at least one sensor.

10. The method according to claim 1, further comprising continuously performing the optimization process in order to maintain the amplitude of the resultant vibration at a minimum.

11. The method according to claim 1, further comprising:

determining at least one amplitude of at least one further harmonic in the gearbox vibrations, selecting an initial phase angle and an initial amplitude, based on the rotational speed of the generator, on initial characteristics of the wind turbine, and on the at least one amplitude of the at least one further harmonic in the gearbox vibrations, performing an optimization process including adjusting the initial phase angle and the initial amplitude in order to obtain a minimum in amplitude of a resultant vibration of vibrations originating from the gearbox and vibrations originating from the generator, corresponding to the at least one further harmonic in the gearbox vibrations, thereby obtaining an adjusted phase angle and an adjusted amplitude, and generating a further torque modulating signal for the generator specifying the adjusted phase angle and the adjusted amplitude, wherein injecting the torque modulating signal into the generator comprises adding the adjusted torque modulating signal and the further torque modulating signal(s), thereby obtaining a resultant torque modulating signal, and injecting the resultant torque modulating signal into the generator.

12. A method for controlling operation of a generator for a wind turbine, comprising:

generating a torque modulating signal for the generator by:

selecting an initial phase angle and an initial amplitude, based on a rotational speed of the generator, on initial characteristics of the wind turbine, and on at least one amplitude of a harmonic in gearbox vibrations originating from gear tooth meshing of a gearbox, performing an optimization process to obtain an adjusted phase angle and an adjusted amplitude, and generating a torque modulating signal for the generator specifying the adjusted phase angle and the adjusted amplitude, injecting the torque modulating signal into the generator, thereby minimizing the resultant vibrations that include vibrations of the gearbox and vibrations of the generator, corresponding to the harmonic in the gearbox vibrations, and deriving information regarding residual vibrations at the minimised resultant vibration.

* * * * *